United States Patent
Kim (10) Patent No.: US 9,575,585 B2
(45) Date of Patent: Feb. 21, 2017

(54) DISPLAY DEVICE AND TOUCH SENSOR

(71) Applicant: Samsung Display Co., Ltd., Yongin, Gyeonggi-Do (KR)

(72) Inventor: Yong Joo Kim, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 45 days.

(21) Appl. No.: 14/747,969

(22) Filed: Jun. 23, 2015

(65) Prior Publication Data
US 2016/0162085 A1   Jun. 9, 2016

(30) Foreign Application Priority Data

Dec. 9, 2014   (KR) ...................... 10-2014-0175949

(51) Int. Cl.
*G06F 3/044*   (2006.01)
*G06F 3/041*   (2006.01)

(52) U.S. Cl.
CPC ............. *G06F 3/0412* (2013.01); *G06F 3/044* (2013.01); *G06F 3/0416* (2013.01)

(58) Field of Classification Search
CPC ........ G06F 3/044; G06F 3/0412; G06F 3/045; G06F 3/0416
See application file for complete search history.

(56) References Cited

U.S. PATENT DOCUMENTS

| 9,327,965 B2 * | 5/2016 | Gogoi | ...................... H01L 27/14 |
| 2014/0028599 A1 | 1/2014 | Jeong | |
| 2014/0218631 A1 * | 8/2014 | Kang | ...................... G06F 3/044 349/12 |
| 2015/0205407 A1 * | 7/2015 | Kim | ...................... G06F 3/044 345/174 |
| 2016/0034078 A1 * | 2/2016 | Ryu | ...................... G06F 3/047 345/174 |
| 2016/0103526 A1 * | 4/2016 | Sohn | ...................... G06F 3/044 345/174 |

FOREIGN PATENT DOCUMENTS

| KR | 10-2013-0049692 | 5/2013 |
| KR | 10-2014-0016071 | 2/2014 |
| KR | 10-2014-0037530 | 3/2014 |

* cited by examiner

*Primary Examiner* — Ricardo L Osorio
(74) *Attorney, Agent, or Firm* — Innovation Counsel LLP (57) ABSTRACT

A display device includes: a display panel including a plurality of pixels; a plurality of driving electrodes disposed on the display panel and extending in a first direction; a plurality of sensing electrodes disposed on the driving electrodes and extending in a second direction; a plurality of first sensing wires connected to one end of each of the driving electrodes; a plurality of second sensing wires connected to each of the sensing electrodes; a plurality of third sensing wires connected to the other end of each of the driving electrodes that are disposed in a partial region; and a touch controller configured to apply a touch detection signal to the driving electrodes through the first sensing wires and the third sensing wires, and to receive a sensing signal representing a change in capacitance of the sensing electrodes through the second sensing wires, so as to detect a touch position.

20 Claims, 8 Drawing Sheets

DISPLAY DEVICE AND TOUCH SENSOR

CROSS-REFERENCE TO RELATED APPLICATION

This application claims priority to and the benefit of Korean Patent Application No. 10-2014-0175949 filed in the Korean Intellectual Property Office on Dec. 9, 2014, the entire contents of which are incorporated herein by reference.

BACKGROUND (a) Technical Field

The present disclosure generally relates to a display device and a touch sensor, and more particularly, to a display device and a touch sensor having a reduced non-display area.

(b) Description of the Related Art

In general, a display panel of a liquid crystal display (LCD) and an organic light emitting diode display includes a plurality of gate lines and data lines connected with a plurality of pixels. The pixels are formed at the intersections of the gate lines and the data lines. When gate signals comprising gate-on voltages are sequentially applied to the gate lines, data voltages will be applied to the data lines in response to the gate signals so as to write image data in the pixels.

A touch sensor is an input apparatus capable of inputting a user's command to a device. The touch sensor can recognize a touch position of a user on a display panel. For example, the touch sensor may be provided on a front side of a display panel and configured to determine a touch position of a user's hand or an object so as to determine an input signal. A capacitive touch sensor is one of many types of touch sensors that is commonly used. The capacitive touch sensor is configured to sense a user's touch based on a change in capacitance between an electrode and a conductive object such as a finger. For example, the capacitive touch sensor can sequentially apply touch detection signals to a plurality of sensing lines to detect a change in capacitance of the touch position, so as to detect the user's touch.

Recently, a display device having reduced bezel width has been developed. The aforementioned display device includes a display area in which an image is displayed, and a minimized non-display area. However, incorporating a touch sensor into the above display device may pose certain packaging challenges relating to the minimization of the non-display area. For example, wires disposed at an outer portion of the touch sensor could take up space in the non-display area and make it difficult to reduce the non-display area of the display device.

The above information disclosed in this Background section is only to enhance understanding of the background of the inventive concept and therefore it may contain information that does not form the prior art that is already known in this country to a person of ordinary skill in the art.

SUMMARY

According to an exemplary embodiment of the inventive concept, a display device is provided. The display device includes: a display panel including a plurality of pixels; a plurality of driving electrodes disposed on the display panel and extending in a first direction; a plurality of sensing electrodes disposed on the driving electrodes and extending in a second direction; a plurality of first sensing wires connected to one end of each of the driving electrodes; a plurality of second sensing wires connected to each of the sensing electrodes; a plurality of third sensing wires connected to the other end of each of the driving electrodes that are disposed in a partial region; and a touch controller configured to apply a touch detection signal to the driving electrodes through the first sensing wires and the third sensing wires, and to receive a sensing signal representing a change in capacitance of the sensing electrodes through the second sensing wires, so as to detect a touch position.

In some embodiments, the driving electrodes and the sensing electrodes may be disposed at a position corresponding to a display area in which an image is displayed in the display panel.

In some embodiments, the display area may be divided into a first region and a second region, wherein a plurality of driving blocks may be connected to only the first sensing wires that are disposed in the first region, and wherein another plurality of driving blocks may be connected to the first sensing wires and the third sensing wires that are disposed in the second region.

In some embodiments, the first sensing wires, the second sensing wires, and the third sensing wires may be disposed in a non-display area outside the display area.

In some embodiments, the touch controller may be disposed at one end of the driving electrodes and may extend in the first direction.

In some embodiments, the third sensing wires may be disposed in the non-display area bypassing the display area.

In some embodiments, the non-display area may include a wire region in which the third sensing wires bypassing the display area are disposed.

In some embodiments, a width of the wire region may be proportional to a number of the driving electrodes included in the second region.

In some embodiments, the touch controller may be configured to apply a first touch detection signal at a first level to the driving electrodes that are disposed in the second region through the first sensing wires and the third sensing wires.

In some embodiments, the touch controller may be configured to apply a second touch detection signal at a second level to the driving electrodes that are disposed in the first region through the first sensing wires, and wherein the second level may be higher than the first level.

In some embodiments, each of the first region and the second region may be half a size of the display area.

In some embodiments, the first region may be larger than the second region.

In some embodiments, the first region may be smaller than the second region.

In some embodiments, the driving electrodes, the sensing electrodes, the first sensing wires, the second sensing wires, and the third sensing wires may be disposed on a separate transparent substrate.

In some embodiments, the driving electrodes, the sensing electrodes, the first sensing wires, the second sensing wires, and the third sensing wires may be disposed on an outer surface of the display panel.

According to another exemplary embodiment of the inventive concept, a touch sensor is provided. The touch sensor includes: a plurality of driving electrodes extending in a first direction; a plurality of sensing electrodes extending in a second direction; a plurality of first sensing wires connected to one end of each of the driving electrodes; a plurality of second sensing wires connected to each of the sensing electrodes; a plurality of third sensing wires connected to the other end of each of the driving electrodes that are disposed in a partial region; and a touch controller configured to apply a touch detection signal to the driving electrodes through the first sensing wires and the third sensing wires, and to receive a sensing signal representing a change in capacitance of the sensing electrodes through the second sensing wires, so as to detect a touch position.

In some embodiments, an area in which the driving electrodes and the sensing electrodes are disposed may be divided into a first region and a second region, wherein a plurality of driving blocks may be connected to only the first sensing wires that are disposed in the first region, and wherein another plurality of driving blocks may be connected to the first sensing wires and the third sensing wires that are disposed in the second region.

In some embodiments, the touch controller may be disposed at one end of the driving electrodes and may extend in the first direction, and the third sensing wires may be disposed bypassing the area in which the driving electrodes and the sensing electrodes are disposed.

In some embodiments, the touch controller may be configured to apply a first touch detection signal at a first level to the driving electrodes that are disposed in the second region through the first sensing wires and the third sensing wires.

In some embodiments, the touch controller may be configured to apply a second touch detection signal at a second level to the driving electrodes that are disposed in the first region through the first sensing wires, and wherein the second level may be higher than the first level.

According to at least some of the above embodiments, the number of sensing wires disposed at an outer portion of a display device may be reduced so as to reduce a non-display area of the display device, and sensing efficiency of a touch sensor in the display device may be improved.

DETAILED DESCRIPTION

The inventive concept will be described more fully herein with reference to the accompanying drawings, in which exemplary embodiments are shown. As those skilled in the art would realize, the described embodiments may be modified in various ways without departing from the spirit or scope of the inventive concept.

The drawings and description are merely illustrative and should not be construed in a restrictive manner.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element, or with one or more intervening elements being present. In contrast, when an element is referred to as being "directly on" another element, there are no intervening elements present. Throughout this specification and the claims that follow, when it is described that an element is "coupled" to another element, the element may be "directly coupled" to the other element or "electrically coupled" to the other element through a third element. In addition, unless indicated otherwise, the term "comprise" and variations of the term such as "comprises" or "comprising", will be understood to imply the inclusion of stated elements but not the exclusion of any other elements.

Figure 1:
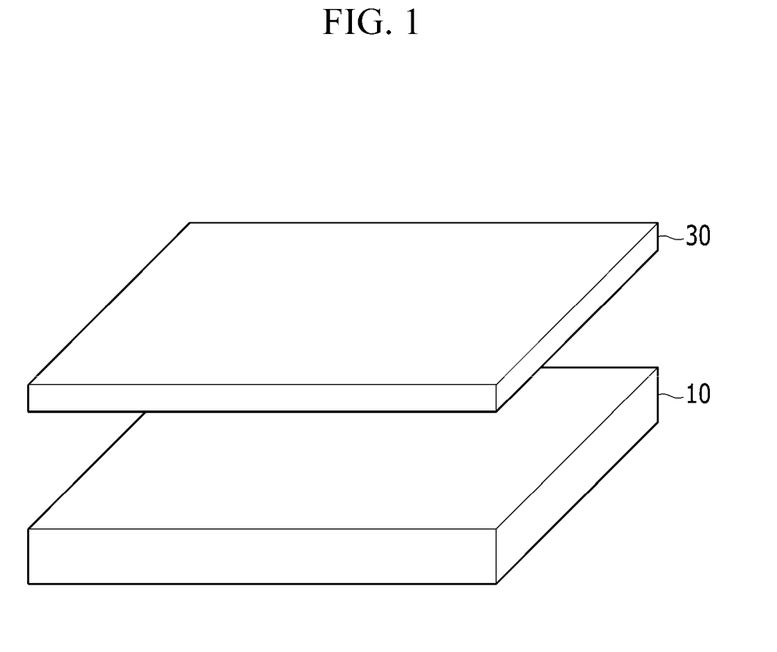
FIG. 1 is a perspective view of a display device according to an exemplary embodiment.

FIG. 1 is a perspective view of a display device according to an exemplary embodiment.

Referring to FIG. 1, the display device includes a display panel 10 and a touch sensor 30 disposed on the display panel 10.

The display panel 10 includes a plurality of display elements. The display elements may include display elements of an organic light emitting diode display (OLED), a liquid crystal display (LCD), or a field emission display (FED). As such, the display panel 10 may be a display panel of any one of an OLED, an LCD, and an FED.

The touch sensor 30 may be based on different types of touch sensing mechanisms. For example, the touch sensor 30 may be a resistive type touch sensor, a capacitive type touch sensor, an ultrasonic type touch sensor, an optical type touch sensor, or an electronic inductive type touch sensor.

An embodiment in which the display panel 10 is a display panel of an LCD and the touch sensor 30 is a capacitive type touch sensor will be described with reference to FIG. 2.

Figure 2:
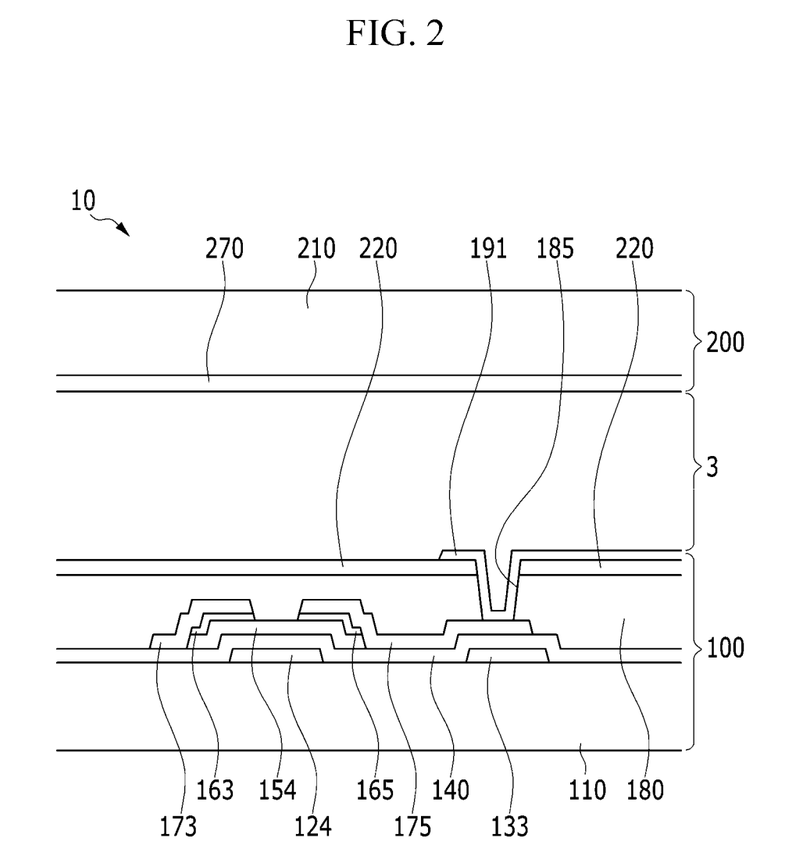
FIG. 2 is a cross-sectional view of a display panel according to an exemplary embodiment.

FIG. 2 is a cross-sectional view of a display panel according to an exemplary embodiment.

Referring to FIG. 2, the display panel 10 includes a lower panel 100 and an upper panel 200 facing each other, and a liquid crystal layer 3 interposed between the two panels 100 and 200.

First, the lower panel 100 will be described.

In the lower panel 100, a gate line and a storage line are formed on a first substrate 110. The first substrate 110 may be made of transparent glass or plastic. The gate line transfers a gate signal and extends in a substantially horizontal direction. Each gate line includes a gate electrode 124 protruding from the gate line.

The storage line receives a predetermined voltage and extends in a substantially horizontal direction. Each storage line includes a storage electrode 133 extending from the storage line.

A gate insulating layer 140 is disposed on the gate electrode 124 and the storage electrode 133. The gate insulating layer 140 may be formed of silicon oxide (SiOx) or silicon nitride (SiNx). The gate insulating layer 140 may have a multilayer structure including at least two insulating layers having different physical properties.

A semiconductor 154 is disposed on the gate insulating layer 140. The semiconductor 154 may be made of hydrogenated amorphous silicon or crystalline silicon. In some embodiments, the semiconductor 154 may include an oxide semiconductor.

Ohmic contacts 163 and 165 are positioned on the semiconductor 154 facing each other to form a pair. The ohmic contacts 163 and 165 may be made of a material such as silicide, or n+ hydrogenated amorphous silicon having a high dopant concentration of an N-type impurity (such as phosphorus). The ohmic contacts 163 and 165 are disposed on the semiconductor 154 to form a pair. In some particular embodiments, when the semiconductor 154 is an oxide semiconductor, the ohmic contacts 163 and 165 may be omitted.

A data line is disposed on the ohmic contacts 163 and 165 and the gate insulating layer 140. The data line includes a source electrode 173 and a drain electrode 175.

The data line transfers a data voltage and extends in a substantially vertical direction crossing the gate line.

The drain electrode 175 faces the source electrode 173 with the gate electrode 124 disposed therebetween.

The gate electrode 124, the source electrode 173, and the drain electrode 175, together with the semiconductor 154, collectively constitute a thin film transistor (TFT). A channel of the thin film transistor is formed in the semiconductor 154 between the source electrode 173 and the drain electrode 175.

The data line and the drain electrode 175 may be made of a refractory metal such as molybdenum, chromium, tantalum, or titanium, or alloys thereof. In some embodiments (not illustrated), the data line and the drain electrode 175 may have a multilayer structure including a refractory metal layer and a low resistive conductive layer. For example, in some embodiments, the multilayer structure may include a double layer consisting of a chrome or molybdenum (or Cr alloy or Mo alloy) lower layer and an aluminum (or Al alloy) upper layer. In other embodiments, the multilayer structure may include a triple layer consisting of a molybdenum (or Mo alloy) lower layer, an aluminum (or Al alloy) intermediate layer, and a molybdenum (or Mo alloy) upper layer. However, it should be understood that the data line and the drain electrode 175 may also be formed using various metals or conductors in addition to the materials listed above.

A passivation layer 180 is formed on the drain electrode 175, the source electrode 173, and the exposed semiconductor 154. The passivation layer 180 may be made of an inorganic insulating material such as silicon nitride or silicon oxide, or an organic insulating material. In some embodiments, the passivation layer 180 may be a low dielectric insulating material having a dielectric constant of 4.0 or less.

An overcoat 220 is disposed on the passivation layer 180. The overcoat 220 may be made of an organic insulating material and provides a flat/planar surface. In some particular embodiments, the overcoat 220 may be omitted.

A contact hole 185 is formed in the passivation layer 180 and the overcoat 220 exposing the drain electrode 175.

A pixel electrode 191 is formed on the overcoat 220. The pixel electrode 191 is made of a transparent conductive material, for example, ITO, IZO, or the like. The pixel electrode 191 is electrically connected to the drain electrode 175 through the contact hole 185.

In some embodiments, an alignment layer (not illustrated) may be formed on the pixel electrode 191 and the overcoat 220.

Next, the upper panel 200 will be described.

The upper panel 200 includes a second substrate 210 and a common electrode 270 disposed on the second substrate 210.

The common electrode 270 may be formed in a planar shape on an entire surface of the second substrate 210. The common electrode 270 may be made of a transparent conductive material such as ITO or IZO. In some embodiments, an alignment layer (not illustrated) may be formed below the common electrode 270.

In the example of FIG. 2, the common electrode 270 is included in the upper panel 200. However, it should be noted that the common electrode 270 may be included in the lower panel 100 in some other embodiments. Furthermore, the structure of the display panel 10 is not limited to the configuration illustrated in FIG. 2 and may be modified in various ways.

Figure 3:
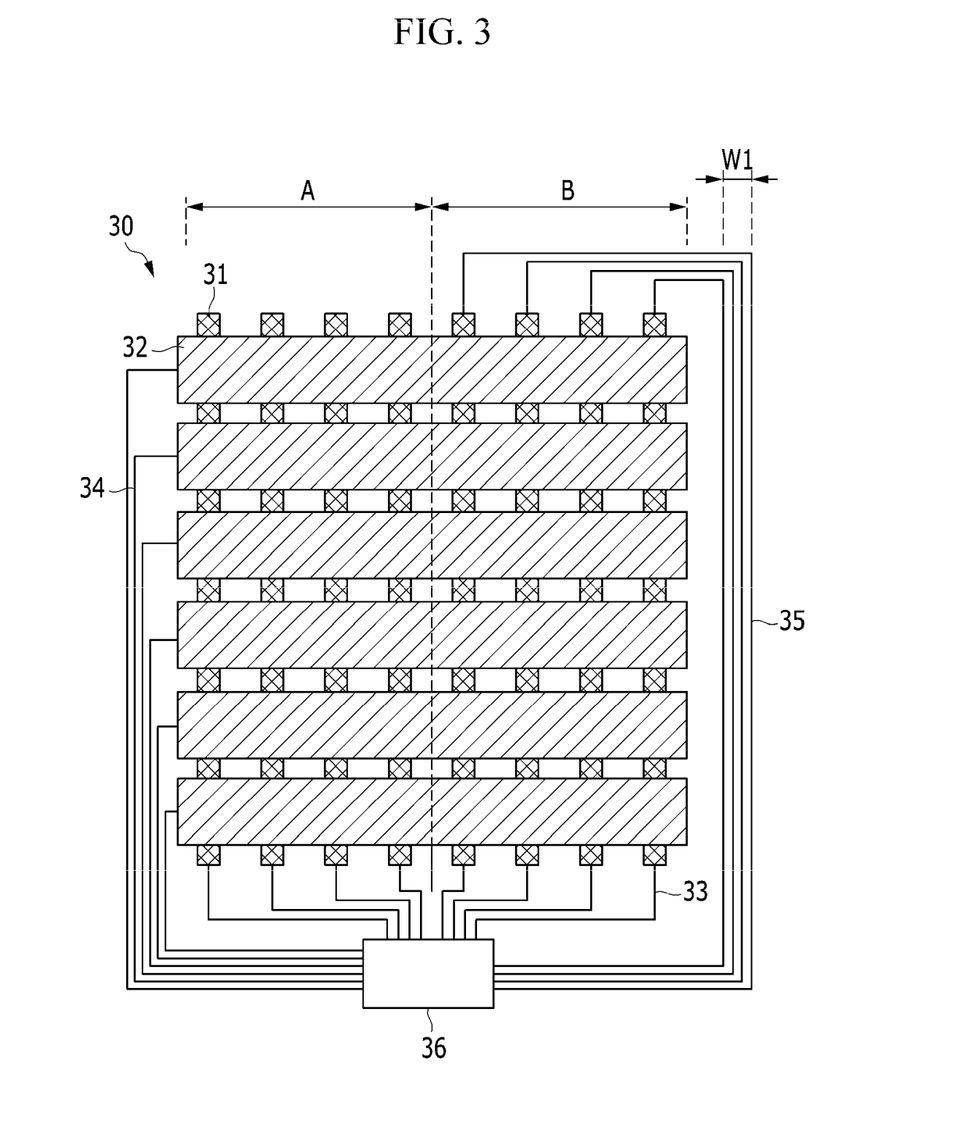
FIG. 3 is a plan view of a touch sensor according to an exemplary embodiment.

FIG. 3 is a plan view of a touch sensor according to an exemplary embodiment.

Referring to FIG. 3, the touch sensor 30 includes a plurality of driving electrodes 31, a plurality of sensing electrodes 32, a plurality of first sensing wires 33, a plurality of second sensing wires 34, a plurality of third sensing wires 35, and a touch controller 36.

In some embodiments, the touch sensor 30 may be formed separately from the display panel 10. In those embodiments, the driving electrodes 31, the sensing electrodes 32, the first sensing wires 33, the second sensing wires 34, and the third sensing wires 35 may be disposed on a separate transparent substrate (not illustrated). An adhesive layer (not illustrated) may be provided between the display panel 10 and the touch panel to attach the display panel 10 and the touch panel to each other. An optical clear adhesive (OCA) may be used as the adhesive layer.

In some alternative embodiments, the touch sensor 30 may be formed or integrated with the display panel 10. In those embodiments, the driving electrodes 31, the sensing electrodes 32, the first sensing wires 33, the second sensing wires 34, and the third sensing wires 35 may be disposed on an outer surface of the upper panel 200 of the display panel 10.

The driving electrodes 31 extend in a first direction (vertical direction), the sensing electrodes 32 extend in a second direction (horizontal direction) substantially perpendicular to the first direction, such that the driving electrodes 31 and the sensing electrodes 32 are formed crossing each other. The driving electrodes 31 and the sensing electrodes 32 may be disposed at a position corresponding to the display area in which the image is displayed in the display panel 10. As shown in FIG. 3, the display area may be divided into a region A and a region B.

The driving electrodes 31 and the sensing electrodes 32 may be formed of transparent conductive layers such as layers made of indium tin oxide (ITO). Alternatively, the driving electrodes 31 and the sensing electrodes 32 may be formed of a metal mesh. The metal mesh may be prepared by minute patterning of a metal having high conductivity.

The metal mesh may be prepared by a printing method, an imprinting method, or a lithography method. The printing method includes directly forming a transparent electrode (or a wire) on the substrate with a transparent conductive material (or a metal material) using a gravure or offset method. The imprinting method includes forming the transparent electrode (or a wire) by etching a transparent conductive layer (or a metal layer) through a minute pattern, after forming the minute pattern on the transparent conductive layer or the metal layer. The lithography method includes forming a minute pattern on the substrate using light, a laser, or an electron beam, and forming a transparent electrode (or a wire) by etching a transparent conductive layer (or a metal layer) using the minute pattern.

A plurality of metal patterns constituting the metal mesh may be formed having a line width ranging from about 0.1 μm to about 10 μm. The metal patterns may be made of a metal material such as copper (Cu), aluminum (Al), molybdenum (Mo), or silver (Ag). It is noted that the driving electrodes 31 and the sensing electrodes 32 formed by the metal mesh have high conductivity and high transparency.

An insulating layer (not illustrated) may be disposed between the driving electrodes 31 and the sensing electrodes 32. The insulating layer is interposed between the driving electrodes 31 and the sensing electrodes 32 so as to separate the driving electrodes 31 and the sensing electrodes 32 from each other. The insulating layer may include an inorganic insulating material such as silicon oxide (SiOx) or silicon nitride (SiNx). In some alternative embodiments, the insulating layer may include an organic insulating material such as a cellulose derivative, an olefin resin, an acrylic resin, a vinyl chloride resin, a styrene resin, a polyester resin, a polyamide resin, a polycarbonate resin, a polycycloolefin resin, or an epoxy resin.

The driving electrodes 31 and the sensing electrodes 32 are separated from each other by the insulating layer. As a result, a capacitance is formed between the driving electrodes 31 and the sensing electrodes 32.

Each of the first sensing wires 33 is connected to one end of each of the driving electrodes 31. In addition, the first sensing wires 33 are connected to the touch controller 36. That is, the driving electrodes 31 are connected to the touch controller 36 through the first sensing wires 33.

Each of the second sensing wires 34 is connected to each of the sensing electrodes 32. Each of the second sensing wires 34 may be connected to one end of each of the sensing electrodes 32. In addition, the second sensing wires 34 are connected to the touch controller 36. That is, the sensing electrodes 32 are connected to the touch controller 36 through the second sensing wires 34.

Each of the third sensing wires 35 is connected to the other end of each of the driving electrodes 31 that are disposed in the region B. In addition, the third sensing wires 35 are connected to the touch controller 36. That is, the driving electrodes 31 that are disposed in the region B are connected to the touch controller 36 through the first sensing wire 33 and the third sensing wire 35. On the other hand, the driving electrodes 31 that are disposed in the region A are connected to the touch controller 36 through the first sensing wire 33. Each of the region A and the region B may be half the size of the display area. It is noted that a size ratio of the region A and the region B may be modified as necessary. For example, the region A may be determined to be larger than the region B in some embodiments, or smaller than the region B in other embodiments.

The first sensing wires 33, the second sensing wires 34, and the third sensing wires 35 may be disposed in the non-display area outside the display area.

The touch controller 36 may be disposed at one side of the driving electrodes 31 extending in the first direction. The touch controller 36 is connected to the driving electrodes 31 that are disposed in the region A and the region B through the first sensing wires 33 at one end of the driving electrodes 31. In addition, the touch controller 36 is connected to the other end of the driving electrodes 31 that are disposed in the region B through the third sensing wires 35 at the other end of the driving electrodes 31. To connect the touch controller 36 with the other end of the driving electrodes 31 that are disposed in the region B, the third sensing wire 35 may be disposed in the non-display area by bypassing the display area. A wiring region W1 is provided in the non-display area for a layout of the third sensing wires 35 to bypass the display area. A width of the wiring region W1 in which the third sensing wires 35 are disposed may be proportional to the number of driving electrodes 31 included in the region B.

The above-described structure in which only some of the driving electrodes 31 are connected to the first sensing wires 33 and the third sensing wires 35 is referred to as a half double root pattern.

The touch controller 36 is configured to apply a touch detection signal to the driving electrodes 31 through the first sensing wires 33 and the third sensing wires 35, and to receive a sensing signal representing a change in capacitance of the second sensing electrodes 32 through the second sensing wires 34, so as to detect a touch position. In this case, the touch controller 36 may apply a first touch detection signal at a first level to the driving electrodes 31 that are disposed in the region B through the first sensing wires 33 and the third sensing wires 35, and a second touch detection signal at a second level to the driving electrodes 31 that are disposed in the region A through the first sensing wires 33. The second level of the second touch detection signal may be higher than the first level the first touch detection signal.

Next, a touch sensor according to different comparative examples will be described with reference to FIGS. 4 and 5. In the interest of clarity, the following description shall focus on the differences between the comparative examples of FIGS. 4 and 5 and the exemplary touch sensor of FIG. 3.

Figure 4:
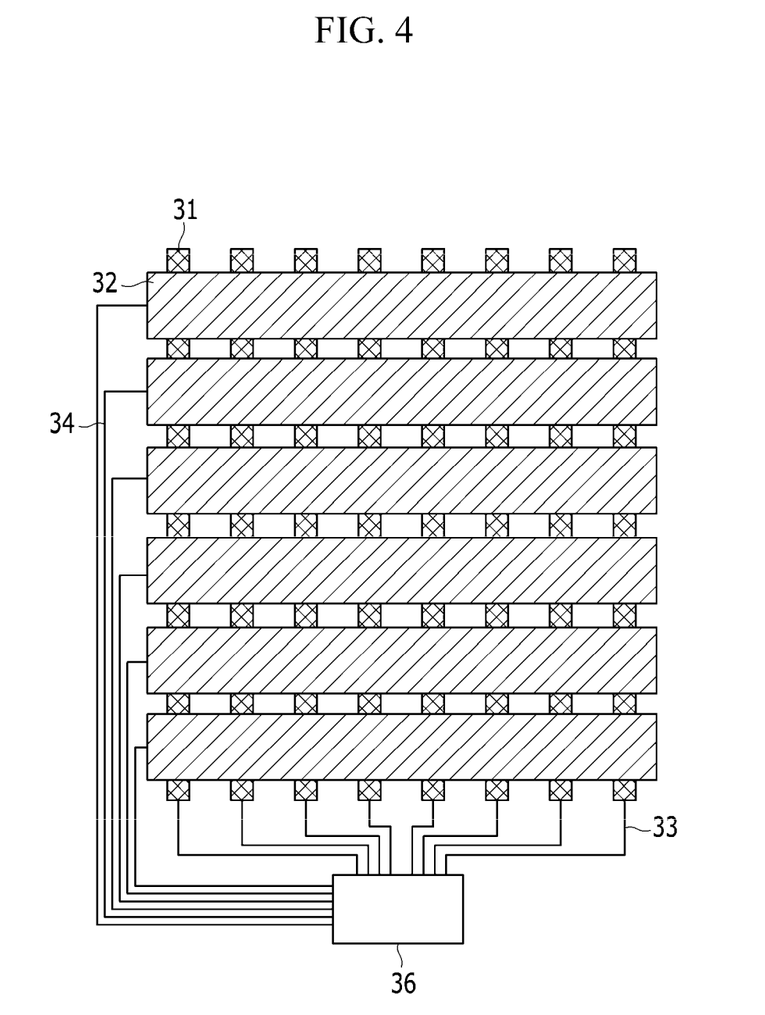
FIG. 4 is a plan view of a touch sensor according to a comparative example.

FIG. 4 is a plan view of a touch sensor according to a comparative example.

Referring to FIG. 4, the touch sensor includes a plurality of driving electrodes 31, a plurality of sensing electrodes 32, and a touch controller 36. The driving electrodes 31 are connected to the touch controller 36 through a plurality of first sensing wires 33, and the sensing electrodes 32 are connected to the touch controller 36 through a plurality of second sensing wires 34. Unlike the exemplary touch sensor of FIG. 3, the touch sensor according to the comparative example of FIG. 4 does not include a plurality of third sensing wires 35. The above-described structure of FIG. 4 in which the driving electrodes 31 are connected to the touch controller 36 through only the first sensing wires 33 is referred to as a single root pattern.

In the single root pattern, the touch controller 36 is configured to apply a touch detection signal at a same level to the driving electrodes 31 through the first sensing wires 33.

Figure 5:
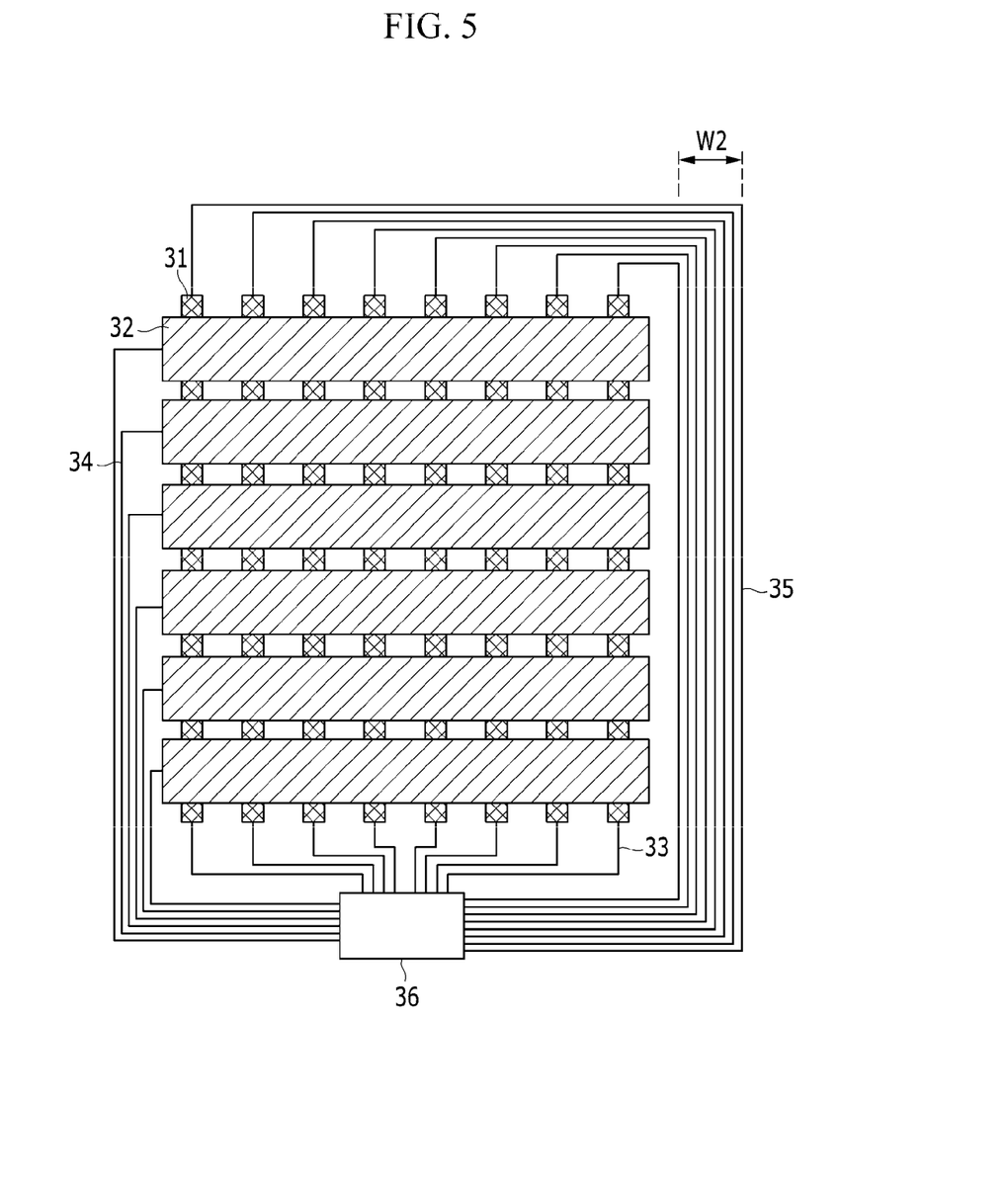
FIG. 5 is a plan view of a touch sensor according to another comparative example.

FIG. 5 is a plan view of a touch sensor according to another comparative example.

Referring to FIG. 5, the touch sensor includes a plurality of driving electrodes 31, a plurality of sensing electrodes 32, and a touch controller 36. The driving electrodes 31 are connected to the touch controller 36 through a plurality of first sensing wires 33 and a plurality of third sensing wires 35. The sensing electrodes 32 are connected to the touch controller 36 through the second sensing wires 34. In the touch sensor of FIG. 5, all of the driving electrodes 31 are connected to the first sensing wires 33 and the third sensing wires 35. To connect the third sensing wires 35 to the other end of all of the driving electrodes 31, the number of third sensing wires 35 needs to be increased in the comparative example of FIG. 5 compared to the embodiment of FIG. 3. In addition, a wire region W2 of the non-display area for the layout of the third sensing wires 35 in the comparative example of FIG. 5 needs to be larger in size than the wiring region W1 in the embodiment of FIG. 3. The above-described structure of FIG. 5 in which all of the driving electrodes 31 are connected to the touch controller 36 through the first sensing wires 33 and the third sensing wires 35 is referred to as a double root pattern.

In the double root pattern, the touch controller 36 is configured to apply a touch detection signal at a same level to the driving electrodes 31 through the first sensing wires 33 and the third sensing wires 35.

Next, the sensitivity of the touch sensors in the half double root pattern according to the embodiment of FIG. 3, the signal root pattern according to the comparative example of FIG. 4, and the double root pattern according to the comparative example of FIG. 5, will be described with reference to FIGS. 6, 7, and 8. To evaluate the sensitivity of the touch sensor, levels of the sensing signal between six points which are evenly distributed in the touch sensor are measured. It may be determined that the touch sensor has improved sensitivity when a difference between the levels of the sensing signal between the six points is small (reduced).

Figure 6:
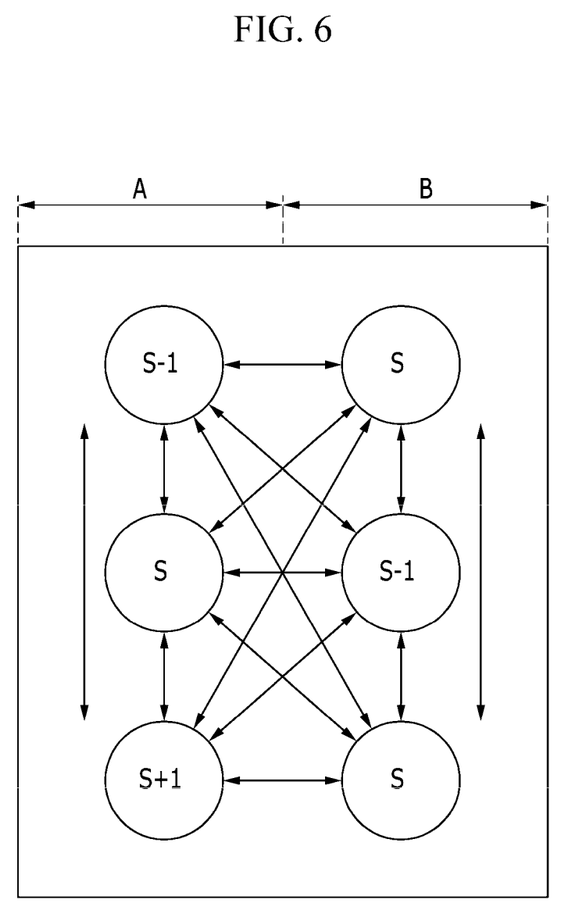
FIG. 6 is a schematic diagram illustrating the sensitivity of the touch sensor of FIG. 3.

FIG. 6 is a schematic diagram illustrating the sensitivity of the touch sensor according to the embodiment of FIG. 3.

Referring to FIG. 6, since the first touch detection signal at the first level is applied to the driving electrodes 31 that are disposed in the region B through the first sensing wire 33 and the third sensing wire 35, a sensing signal at an S level is received from both ends of the driving electrodes 31 in the region B, and a sensing signal at an S−1 level may be received from an intermediate portion of the driving electrodes 31 due to a voltage drop as a result of self-resistance of the driving electrodes 31.

The second touch detection signal at the second level is applied to the driving electrodes 31 that are disposed in the region A through the first sensing wire 33. As previously described, the second level of the second touch detection signal may be higher than the first level of the first touch detection signal. Accordingly, in the region A, a sensing signal at an S+1 level may be received from one end of the driving electrodes 31 connected to the first sensing wire 33. In this case, in the region A, the level of the sensing signal may be lowered to the S level and the S−1 level by the voltage drop due to the self-resistance of the driving electrodes 31.

In the example of FIG. 6, four points have a difference of zero (0) between the levels of the sensing signal between two points, nine points have a difference of one (1) between the levels of the sensing signal between two points, and two points have a difference of two (2) between the levels of the sensing signal between two points.

Figure 7:
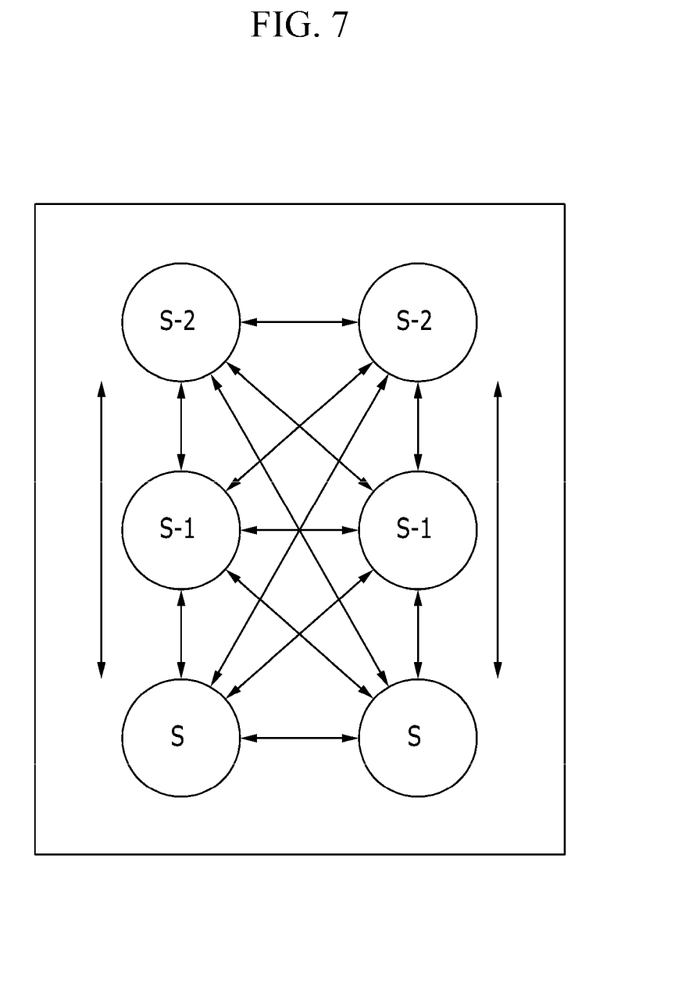
FIG. 7 is a schematic diagram illustrating the sensitivity of the touch sensor of FIG. 4.

FIG. 7 is a schematic diagram illustrating the sensitivity of the touch sensor according to the comparative example of FIG. 4.

Referring to FIG. 7, since the touch detection signal at the first level is applied to all of the driving electrodes 31 through the first sensing wire 33, the sensing signal at the S level may be received from one end of the driving electrodes 31 connected to the first sensing wire 33. On the other hand, in the region A, the level of the sensing signal may be lowered to the S−1 level and the S−2 level by a voltage drop due to the self-resistance of the driving electrodes 31.

In the example of FIG. 7, three points have a difference of zero (0) between the levels of the sensing signal between two points, eight points have a difference of one (1) between the levels of the sensing signal between two points, and four points have a difference of two (2) between the levels of the sensing signal between two points.

Comparing FIG. 6 with FIG. 7, it is noted that the embodiment of FIG. 6 has more instances in which the difference between the levels of the sensing signal between two points is small (for example, points having a difference of zero (0) and one (1)). Accordingly, it may be determined that the exemplary touch sensor of FIG. 3 has better sensitivity than the comparative touch sensor of FIG. 4. In other words, the half double root pattern in the embodiment of FIG. 3 has improved sensitivity compared to the single root pattern in the comparative example of FIG. 4.

Figure 8:
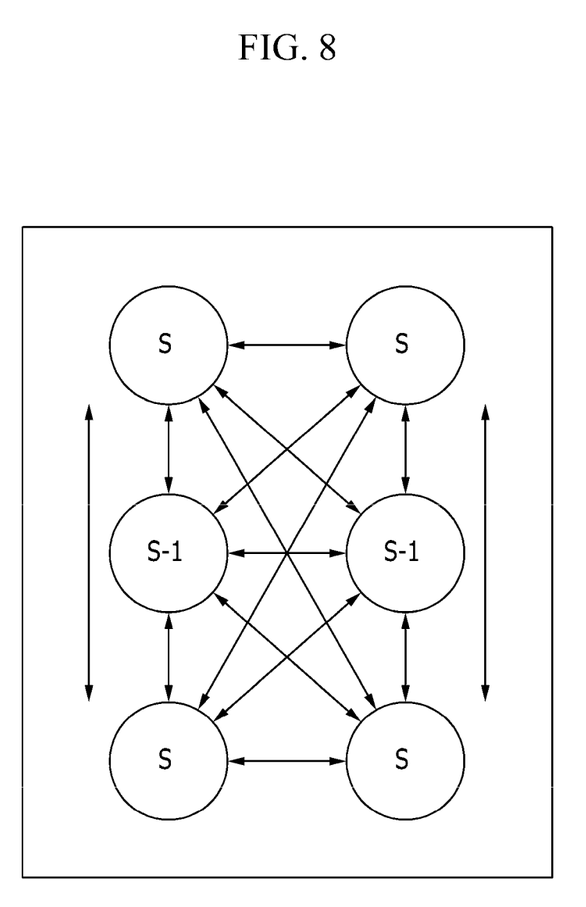
FIG. 8 is a schematic diagram illustrating the sensitivity of the touch sensor of FIG. 5.

FIG. 8 is a schematic diagram illustrating the sensitivity of the touch sensor according to the comparative example of FIG. 5.

Referring to FIG. 8, since the touch detection signal at the first level is applied to all of the driving electrodes 31 through the first sensing wire 33 and the third sensing wire 35, the sensing signal at the S level may be received from both ends of the driving electrodes 31 connected to the first sensing wire 33 and the third sensing wire 35. On the other hand, the level of the sensing signal may be lowered to the S−1 level at a middle portion of the driving electrodes 31 by a voltage drop due to the self-resistance of the driving electrodes 31.

In the example of FIG. 8, seven points have a difference of zero (0) between the levels of the sensing signal between two points, eight points have a difference of one (1) between the levels of the sensing signal between two points, and there are no points that have a difference of two (2) between the levels of the sensing signal between two points.

Comparing FIG. 6 with FIG. 8, it is noted that the comparative example of FIG. 8 has more instances in which the difference between the levels of the sensing signal between two points is small (for example, points having a difference of zero (0) and one (1)). Accordingly, it may be determined that the comparative touch sensor of FIG. 5 has better sensitivity than the exemplary touch sensor of FIG. 3. In other words, the double root pattern according to the comparative example of FIG. 5 has improved sensitivity compared to the half double root pattern in the embodiment of FIG. 3.

However, as previously noted, for the double root pattern illustrated in FIG. 5, the wire region W2 of the non-display area for the layout of the third sensing wire 35 needs to be larger than the wire region W1 in the embodiment of FIG. 3. As a result, even though the comparative example of FIG. 5 has improved sensitivity compared to the embodiment of FIG. 3, the reduction of the non-display area is limited due to the increased size of the wire region W2. Thus, comparing the embodiment of FIG. 3 with the comparative examples of FIGS. 4 and 5, it is noted that the exemplary touch sensor of FIG. 3 offers the advantages of both improved sensitivity and reduced non-display area.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device, comprising:
a display panel including a plurality of pixels;
a plurality of driving electrodes disposed on the display panel and extending in a first direction;
a plurality of sensing electrodes disposed on the driving electrodes and extending in a second direction;
a plurality of first sensing wires connected to one end of each of the driving electrodes;
a plurality of second sensing wires connected to each of the sensing electrodes;
a plurality of third sensing wires connected to the other end of each of the driving electrodes that are disposed in a partial region; and
a touch controller configured to apply a touch detection signal to the driving electrodes through the first sensing wires and the third sensing wires, and to receive a sensing signal representing a change in capacitance of the sensing electrodes through the second sensing wires, so as to detect a touch position.

2. The display device of claim 1, wherein the driving electrodes and the sensing electrodes are disposed at a position corresponding to a display area in which an image is displayed in the display panel.

3. The display device of claim 2, wherein the display area is divided into a first region and a second region,
wherein a plurality of driving blocks are connected to only the first sensing wires that are disposed in the first region, and
wherein another plurality of driving blocks are connected to the first sensing wires and the third sensing wires that are disposed in the second region.

4. The display device of claim 3, wherein the first sensing wires, the second sensing wires, and the third sensing wires are disposed in a non-display area outside the display area.

5. The display device of claim 4, wherein the touch controller is disposed at one end of the driving electrodes and extends in the first direction.

6. The display device of claim 5, wherein the third sensing wires are disposed in the non-display area bypassing the display area.

7. The display device of claim 6, wherein the non-display area includes a wire region in which the third sensing wires bypassing the display area are disposed.

8. The display device of claim 7, wherein a width of the wire region is proportional to a number of the driving electrodes included in the second region.

9. The display device of claim 3, wherein the touch controller is configured to apply a first touch detection signal at a first level to the driving electrodes that are disposed in the second region through the first sensing wires and the third sensing wires.

10. The display device of claim 9, wherein the touch controller is configured to apply a second touch detection signal at a second level to the driving electrodes that are disposed in the first region through the first sensing wires, and wherein the second level is higher than the first level.

11. The display device of claim 3, wherein each of the first region and the second region is half a size of the display area.

12. The display device of claim 3, wherein the first region is larger than the second region.

13. The display device of claim 3, wherein the first region is smaller than the second region.

14. The display device of claim 1, wherein the driving electrodes, the sensing electrodes, the first sensing wires, the second sensing wires, and the third sensing wires are disposed on a separate transparent substrate.

15. The display device of claim 1, wherein the driving electrodes, the sensing electrodes, the first sensing wires, the second sensing wires, and the third sensing wires are disposed on an outer surface of the display panel.

16. A touch sensor, comprising:
a plurality of driving electrodes extending in a first direction;
a plurality of sensing electrodes extending in a second direction;
a plurality of first sensing wires connected to one end of each of the driving electrodes;
a plurality of second sensing wires connected to each of the sensing electrodes;
a plurality of third sensing wires connected to the other end of each of the driving electrodes that are disposed in a partial region; and
a touch controller configured to apply a touch detection signal to the driving electrodes through the first sensing wires and the third sensing wires, and to receive a sensing signal representing a change in capacitance of the sensing electrodes through the second sensing wires, so as to detect a touch position.

17. The touch sensor of claim 16, wherein an area in which the driving electrodes and the sensing electrodes are disposed is divided into a first region and a second region,
wherein a plurality of driving blocks are connected to only the first sensing wires that are disposed in the first region, and
wherein another plurality of driving blocks are connected to the first sensing wires and the third sensing wires that are disposed in the second region.

18. The touch sensor of claim 17, wherein the touch controller is disposed at one end of the driving electrodes and extends in the first direction, and
the third sensing wires are disposed bypassing the area in which the driving electrodes and the sensing electrodes are disposed.

19. The touch sensor of claim 17, wherein the touch controller is configured to apply a first touch detection signal at a first level to the driving electrodes that are disposed in the second region through the first sensing wires and the third sensing wires.

20. The touch sensor of claim 19, wherein the touch controller is configured to apply a second touch detection signal at a second level to the driving electrodes that are disposed in the first region through the first sensing wires, and wherein the second level is higher than the first level.

* * * * *